_United States Patent Office_

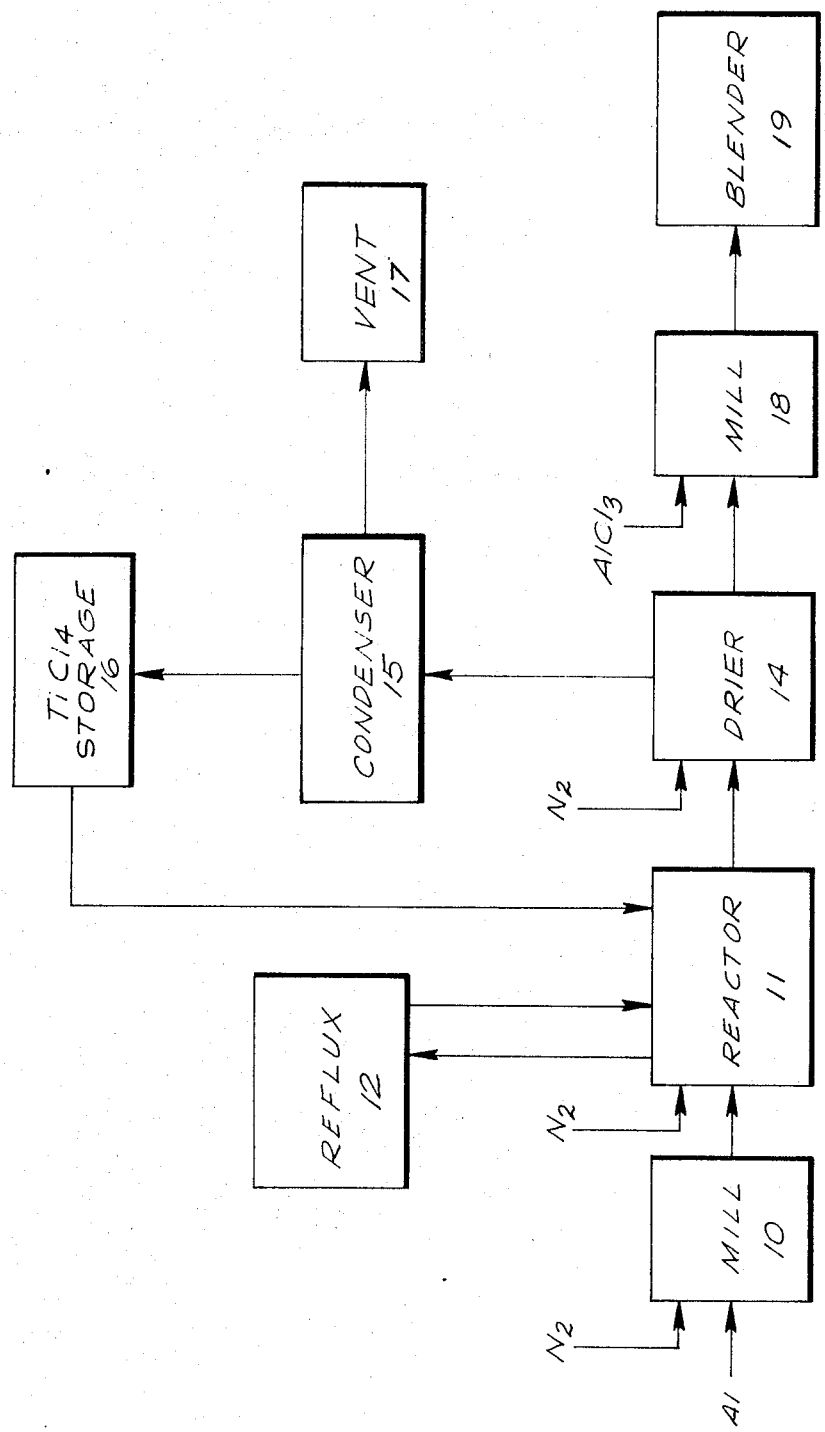

3,770,656
Patented Nov. 6, 1973

3,770,656
PROCESS FOR PRODUCING TITANIUM TRI-CHLORIDE-ALUMINUM TRICHLORIDE IN CONTROLLED PROPORTIONS
Arthur P. Haag, Moraga, and Meyer Weiner, Orinda, Calif., assignors to Dart Industries Inc., Los Angeles, Calif.
Filed Feb. 9, 1970, Ser. No. 9,613
Int. Cl. B01j *11/78*
U.S. Cl. 252—442                                8 Claims

ABSTRACT OF THE DISCLOSURE

An improved process for producing co-crystals of titanium trichloride and aluminum trichloride with a desired composition preferably about three moles of titanium trichloride and one mole of aluminum trichloride, and substantially free of impurities is described. Such crystals are of value as a catalyst, particularly, for example, for preparing polypropylene. The co-crystals are prepared by reacting titanium tetrachloride with aluminum in an excess of titanium tetrachloride. After reaction, excess titanium tetrachloride is vaporized by heating the co-crystals. The improved process provided herein involves dry ball milling of a selected addition of aluminum trichloride with the co-crystals after formation, for enriching the co-crystals back to stoichiometry to compensate for aluminum trichloride volatilized in the drying operation.

BACKGROUND

This invention is related to processes described and claimed in copending U.S. patent application related to production of co-crystals of titanium trichloride and aluminum trichloride. These copending patent applications are Ser. No. 9,615 entitled "Process for Producing Activated Titanium Trichloride-Aluminum Trichloride" by Arthur P. Haag and Meyer Weiner, and Ser. No. 9,614 entitled "Removal of Titanium Tetrachloride from Titanium Trichloride-Aluminum Trichloride" by Arthur P. Haag and Meyer Weiner. The descriptions of these copending patent applications are hereby incorporated by reference for full force and effect as if set forth in full herein.

A combination of titanium trichloride and aluminum trichloride having a substantially stoichiometric quantity of these two compounds with three moles of titanium trichloride to each mole of aluminum trichloride has proven to be a valuable catalyst, particularly for the polymerization of polypropylene. Other compositions are desirable in other applications. It is believed that, in order to be a high efficiency catalyst, co-crystals of the two materials are required, although it is not certain that the product is in fact a co-crystal and not some other combination of the two trichlorides. Mere mixtures of the two are not as effective as catalysts as are co-formed combinations so it is considered that a molecular combination is formed. The material that has a high catalyst efficiency is a purple powder and the only known reliable measure of the material's quality is a determination of the ability of the catalyst to promote a high yield of high quality polymer. It is known that some techniques for manufacturing the combination produce an amorphous brown powder which does not have high catalyst efficiency.

In order to evaluate the catalyst produced in any given manufacturing process, tests of the catalyst efficiency, namely the quantity of polymer that can be made with a given quantity of catalyst, are made. Another measure of the quality of catalyst is the isotacticity of polypropylene made while employing the catalyst. Several such tests are known and employed for evaluating catalysts. Thus, for example, U.S. Pat. 3,241,913 sets forth examples of tests for catalyst efficiency and degree of isotacticity which are suitable for evaluating catalysts. Other well known tests employed in the plastics industry may be employed if desired.

It has been found that in order to obtain a high yield of high quality polypropylene it is desirable to have co-crystals near the stoichiometric proportion of three moles of titanium trichloride per mole of aluminum trichloride. It is also found to be highly desirable that the combined crystals be substantially free of titanium tetrachloride, aluminum metal and iron. Such a catalyst has a high efficiency and produces a high degree of isotacticity in the polymer. When small quantities of catalyst are made under laboratory conditions, the properties of the material are readily controlled so that high quality catalysts can be produced. In a large scale production process, on the other hand, production control requires greater care and economies must be effected wherever possible in order to minimize the costs of the product without sacrificing quality.

The broad process for production of co-crystals of titanium trichloride and aluminum trichloride is well known and involves the reaction

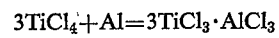
$$3TiCl_4 + Al = 3TiCl_3 \cdot AlCl_3$$

which is normally conducted in an excess of titanium tetrachloride. The composition with one mole of aluminum trichloride co-crystallized with three moles of titanium trichloride is known as the stoichiometric amount. After the reaction is completed, the product is dried to remove excess titanium tetrachloride which would contaminate the final product. A conventional technique for removing titanium tetrachloride involves vaporization by heating the catalyst at a temperature above the boiling point of the titanium tetrachloride so that this relatively volatile material is vaporized. It is found, however, that aluminum trichloride also has a substantial volatility, and heating for a sufficient time and at a temperature to remove substantially all of the titanium tetrachloride may volatilize a substantial amount of aluminum trichloride, thereby upsetting the stoichiometry or other desired composition of the co-crystals. Vacuum drying reduces aluminum trichloride loss but has processing problems such as leaks that permit oxidation and product contamination.

It is, therefore, desirable to employ a process for producing a combination of titanium trichloride and aluminum trichloride wherein the effects of aluminum trichloride vaporization are alleviated, and a desired composition is produced in the catalyst. Such a process should also be economical and not otherwise diminish the catalyst efficiency or diminish the degree of isotacticity obtainable in a polymer made with the catalyst.

SUMMARY OF THE INVENTION

Thus, in the practice of this invention according to a preferred embodiment there is provided an improved process for making a desired composition of titanium trichloride and aluminum trichloride by reaction of titanium tetrachloride and aluminum, including the step of adding a quantity of aluminum trichloride to dried co-crystals and ball milling the mixture for a sufficient time to combine the added aluminum trichloride with the co-crystals to achieve an active, stoichiometric or other composition catalyst.

DRAWING

Objects and many of the attendant advantages of this invention will be appreciated as the same becomes better understood by reference to the following detailed description when considered in connection with the accompanying drawing which comprises a block diagram of a batch process for making co-crystals of titanium trichloride and aluminum trichloride according to principles of this invention.

DESCRIPTION

As mentioned hereinabove, an important process for production of co-crystals of titanium trichloride and aluminum trichloride involves reduction of titanium tetrachloride by aluminum metal. The drawing in this application illustrates in block form a batch process of this nature. In this block diagram, only the principal operative elements are portrayed, and it will be apparent to one skilled in the art that many collateral elements such as pumps, transfer devices, valves, controlling and metering devices and the like are omitted from the diagram since they are conventional and not of such a nature as would affect practice of this invention.

As illustrated in this preferred embodiment, there is provided an initial ball mill 10 which is a conventional steel mill charged with steel balls and operable at room temperature in a conventional manner. Finely divided aluminum metal is placed in the ball mill 10 along with a small quantity of anhydrous aluminum trichloride, titanium trichloride, mixed crystals of aluminum trichloride and titanium trichloride, or other grinding aid to inhibit caking of the aluminum. The ball mill 10 is preferably charged while an inert gas bleed goes inside the mill to blanket the opening for minimizing oxidation of the ingredients and the sealed mill is then operated with a few p.s.i. pressure of an inert gas such as nitrogen or the like. This mixture is dry ground for about one day in order to disrupt oxide coatings on the aluminum, and thereby activate the aluminum powder for more rapid reaction with titanium tetrachloride.

After milling in the ball mill 10 for about one day, the aluminum metal is transferred to a reactor 11 which contains titanium tetrachloride is an initial temperature of not less than about 90° C. or more than about 120° C. so that the exothermic reaction of aluminum and titanium tetrachloride does not initially overheat the reactor. Higher temperatures can be allowed if an adequate reflux condenser is employed. The reactor is, for example, an upright cylindrical vessel capable of containing a few thousand pounds of titanium tetrachloride, and may merely be a steel vessel, although it is preferred that the reactor be glass lined for minimizing possibilities of corrosion and pickup of iron in the final product. The reactor 11 is a closed vessel charged with inert gas such as nitrogen or the like to prevent oxidation of the reactive materials therein. Once the reaction has commenced the reactor is maintained at a temperature between about 136° and 200° C., preferably in the range of about 160° to 180° C. The pressure in the reactor is preferably maintained at about 20 p.s.i.g. to control boiling of the titanium tetrachloride which at atmospheric pressure has a boiling point of about 136° C. The reactor is preferably stirred to maintain the slurry well mixed throughout the reaction period.

The mixture of liquid titanium tetrachloride and finely divided aluminum is maintained in the reactor 11 at a temperature and pressure to keep the mixture at a gentle boil for approximately one day, which is found to be sufficient for substantially complete reaction between the titanium tetrachloride and the aluminum powder. A reflux condenser 12 is employed with the reactor in the conventional manner for returning vaporized titanium tetrachloride to the slurry in the reactor. Throughout the reaction in the reactor, an excess of titanium tetrachloride is maintained. It should be noted that the mixture in the reactor remains a slurry as the aluminum powder is consumed since the titanium trichloride-aluminum trichloride co-crystals formed by the reaction are a finely divided, purple solid at these temperatures, and the viscosity of the slurry actually increases as the aluminum is consumed to form the catalyst.

When the reaction is effectively completed and the aluminum powder consumed, the mixture of titanium and co-crystals of titanium trichloride and aluminum trichloride is transferred to a drier 14 which is merely a closed steel vessel heated to a temperature in the range of from about 150° to 190° C. which is above the boiling point of titanium tetrachloride. If desired, an inert sweep gas, such as nitrogen, may be passed through the drying powder in the drier for carrying vaporized titanium tetrachloride therefrom. The titanium tetrachloride vapor produced in the dried 14 is carried to a conventional condenser 15 where it is reliquified and returned to a titanium tetrachloride storage vessel 16 for return to the reactor 11 as required. Excess nitrogen or other inert gas is released by way of a vent 17.

The mixture of titanium trichloride-aluminum trichloride co-crystals and titanium tetrachloride is maintained in the drier for about one day, which is found to be sufficient to effectively remove substantially all of the excess titanium tetrachloride from the catalyst.

As noted hereinabove, during removal of the titanium tetrachloride by heating, some of the aluminum trichloride in the co-crystals is also vaporized. The co-crystals of the two trichlorides are not necessarily in the desired proportion of titanium trichloride and aluminum trichloride, and a continum of proportions can occur. Thus, for example, if the catalyst material transferred from the reactor to the drier comprises co-crystals having exactly a desired 3:1 ratio, heating in the drier reduces the proportion of aluminum trichloride below the desired amount with a consequent reduction in catalyst quality.

In order to counteract the loss of aluminum trichloride in the drier it is preferred, in practice of this invention, to determine by conventional analytical techniques the composition of the co-crystals and then combine therewith a sufficient quantity of aluminum trichloride to bring the co-crystals to the preferred stoichiometric proportions or other desired composition.

As mentioned hereinabove, mere mixtures of titanium trichloride and aluminum trichloride are not as effective as catalysts as the combined trichlorides that are apparently in the form of co-crystals. The mere addition of aluminum trichloride to non-stoichiometric co-crystals of the trichlorides would not enhance catalyst efficiency either.

The dried co-crystals and aluminum trichloride are, therefore, charged into a ball mill 18 which is preferably a conventional closed steel mill charged with steel balls. The mill is preferably 40 to 60% filled with balls and the interstices between the balls are substantially filled with the mixture of aluminum trichloride and mixed trichloride co-crystals. The mill is rotated at a speed just less than its critical velocity so that the balls are carried to nearly the top of the mill and fall approximately the full mill diameter to impact on the mixture in the mill. The ball mill is preferably operated with supplemental cooling on the exterior, such as low temperature water or a refrigerant so that the mixture therein is not overheated during the ball milling operation. The interior of the mill is preferably filled with nitrogen, argon, or other inert gas to prevent oxidation of the mixture in the mill during the ball milling operation. The ball mill is operated in this manner for a period of several days to activate the catalyst and complete combination of the additional aluminum trichloride with the previously formed co-crystals of titanium trichloride and aluminum trichloride.

Surprisingly, it is found that the combined catalyst, after the ball milling operation, has the same catalyst efficiency and produces the same degree of isotacticity in polypropylene as a catalyst initially having the stoichiometric proportions at the time of initial formation of the co-crystals. It is not known how the added aluminum trichloride combines with the existing non-stoichiometric co-crystals; however, it is known that a bulk sample indicates a stoichiometric composition after the ball milling, and that the performance of the catalyst is indistinguishable from performance of catalyst formed initially in the stoichiometric proportions. It is surmised that the high number of energetic impacts of steel balls on the mixed materials is sufficient to disrupt the original crystal arrangement and cause a true combination of the added aluminum trichloride with the previously existing mixed co-crystals. The possibility of such a combination occurring is enhanced by the very fine particle size in the catalyst material, which is at most a few microns when the co-crystals are charged into the mill and some comminution of these particles is probable in the milling operation.

After ball milling to activate the catalyst and combine the existing co-crystals and added aluminum trichloride to achieve stoichiometry, several batches of the material may be combined and mixed in a blender 19 for achieving greater product uniformity.

The quantity of aluminum trichloride added in the ball mill for combination with the dried co-crystals is preferably less than about 30% of the total aluminum trichloride in the desired composition. If larger quantities are employed, prolonger grinding may be required to yield a catalyst giving the desired degree of isotacticity in polypropylene, and prolonged grinding for some reason tends to reduce catalyst efficiency. It is, therefore, difficult to produce a commercially acceptable product if higher amounts are added.

The exact amount of aluminum trichloride added to a batch of catalyst is determined by conventional analytical techniques for determining the proportion of titanium trichloride and aluminum trichloride in the catalyst after drying. Either a conventional volumetric technique for determining titanium with a valence of three or a gravimetric technique for aluminum may be employed in a conventional manner for determining the composition of the dried co-crystals prior to charging into the ball mill. The sample taken for analysis between the drier and the ball mill serves to determine the quantity of aluminum trichloride to be added to the co-crystals for each individual batch.

As an example of a process performed according to principles of this invention, aluminum powder and an excess of titanium tetrachloride were substantially completely reacted in a conventional manner to produce co-crystals of titanium trichloride and aluminum trichloride in an excess of titanium tetrachloride. The mixture was dried by heating for about 24 hours to remove substantially all of the titanium tetrachloride. After drying, a conventional chemical analysis employing a volumetric technique for titanium with a valence of three and a gravimetric technique for aluminum was performed on the dried co-crystals. This analysis showed that the co-crystals had a composition of about 5.15 moles of titanium trichloride per mole of aluminum trichloride rather than the desired three moles.

Based on this analytical determination of deviation from the desired stoichiometry, 36 pounds of anhydrous aluminum trichloride was added to 350 pounds of the co-crystals. This mixture was then charged into a conventional water-cooled, closed ball mill and charged with a 50% by volume load of steel balls. The mill was operated at slightly less than its critical speed for 90 hours with the dry materials blanketed in an inert atmosphere of nitrogen. The resultant catalyst showed a catalyst efficiency of 217 (217 parts of polypropylene per part of catalyst) and produced a degree of isotacticity in polypropylene of about 97.0%. These values are favorable as compared with values obtained for stoichiometric catalyst prepared by other processes.

Although only one example has been set forth herein of a process conducted according to principles of this invention, many modifications and variations will be apparent to one skilled in the art. Thus, for example, if it is desired to produce co-crystals of titanium trichloride and aluminum trichloride at other than the 3:1 stoichiometric composition, other compositions can be prepared by the same technique of combining aluminum trichloride with existing co-crystals in a suitable proportion to obtain a desired composition. Other grinding apparatus having energetic impacts on the material may also be employed. Many other modifications and variations will be apparent and it is to be understood that within the scope of the appended claims the invention may be practiced otherwise than as specifically described.

What is claimed is:

1. A process for producing a molecular combination of titanium trichloride and aluminum trichloride substantially in a selected proportion of titanium trichloride to aluminum trichloride comprising the steps of:

reacting aluminum with an excess of titanium tetrachloride until substantially complete reaction therebetween is obtained to produce a first co-crystallized product of titanium trichloride and aluminum trichloride;

heating the reaction product for a sufficient time to remove substantially all excess titanium tetrachloride therefrom and to produce a second co-crystallized product of titanium trichloride and aluminum trichloride, said second co-crystallized product containing a lesser percentage of aluminum trichloride than said first co-crystallized product;

adding a portion of anhydrous aluminum trichloride to the second co-crystalized product sufficient to yield a molecularly combined final product having the selected proportion, and grinding the mixture of aluminum trichloride and the second co-crystallized product for a sufficient time to molecularly combine the added aluminum trichloride therewith.

2. A process as defined in claim 1 wherein the molecular combination has a stoichiometric proportion of approximately three moles of titanium trichloride per mole of aluminum trichloride.

3. A process as defined in claim 1 wherein the quantity of aluminum trichloride added is less than about 30% of the total aluminum trichloride in the desired molecular combination.

4. A process as defined in claim 1 wherein the aluminum trichloride and co-crystals are combined by dry ball milling together for a sufficient time to effect molecular combination.

5. A process as defined in claim 4 wherein the molecular combination has a stoichiometric proportion of approximately three moles of titanium trichloride per mole of aluminum trichloride.

6. A process for producing a purified co-crystallized titanium trichloride and aluminum trichloride catalyst substantially in a stoichiometric proportion of about three moles of titanium trichloride per mole of aluminum trichloride and substantially free of titanium tetrachloride and aluminum comprising the steps of:

reacting finely divided aluminum with an excess of titanium tetrachloride at temperatures in the range of about 136° C. to about 200° C. under reflux conditions to form a slurry of a first co-crystallized titanium trichloride and aluminum trichloride product in excess titanium tetrachloride;

drying the slurry of the first co-crystallized product and excess titanium tetrachloride at elevated temperatures for a time sufficient to vaporize and remove substantially all of the excess titanium tetrachloride and to produce a second co-crystallized product of titanium trichloride and aluminum trichloride, said second co-crystallized product containing a lesser percentage of aluminum trichloride than said first co-crystallized product;

transferring the second co-crystallized product to a ball mill and adding a quantity of anhydrous aluminum trichloride in an amount sufficient to yield a mixture of second co-crystallized product and aluminum trichloride substantially equal to a molar ratio of about 3 moles of titanium trichloride per mole of aluminum trichloride; and ball milling the mixture for a time sufficient to molecularly combine the additional aluminum trichloride with the second co-crystallized product.

7. A process as defined in claim 6 wherein the quantity of aluminum trichloride added to the second co-crystallized product is less than about 30% of the total aluminum trichloride in the final catalyst.

8. A process as defined in claim 6 wherein the ball milling is conducted in an inert atmosphere.

References Cited

UNITED STATES PATENTS

| | | | |
|---|---|---|---|
| 3,010,787 | 11/1961 | Tornquist | 252—429 C |
| 3,032,510 | 5/1962 | Tornquist et al. | 252—429 A |
| 3,109,822 | 11/1963 | Kaufman et al. | 252—429 C |
| 3,172,865 | 3/1965 | Fennell | 252—429 C X |
| 3,275,568 | 9/1966 | Stanley et al. | 252—442 |
| 3,461,083 | 8/1969 | Luciani et al. | 252—429 A |
| 3,130,003 | 4/1964 | Tornquist et al. | 252—442 X |
| 3,208,954 | 9/1965 | Rindtorff et al. | 252—442 |
| 3,001,951 | 9/1961 | Tornquist et al. | 252—429 C |
| 3,121,063 | 2/1964 | Tornquist | 252—429 C |

PATRICK P. GARVIN, Primary Examiner

U.S. Cl. X.R.

252—429 C